Nov. 6, 1923.                    V. L. WILSON                    1,473,270
                                 CUSHION TIRE
                              Filed March 23, 1920
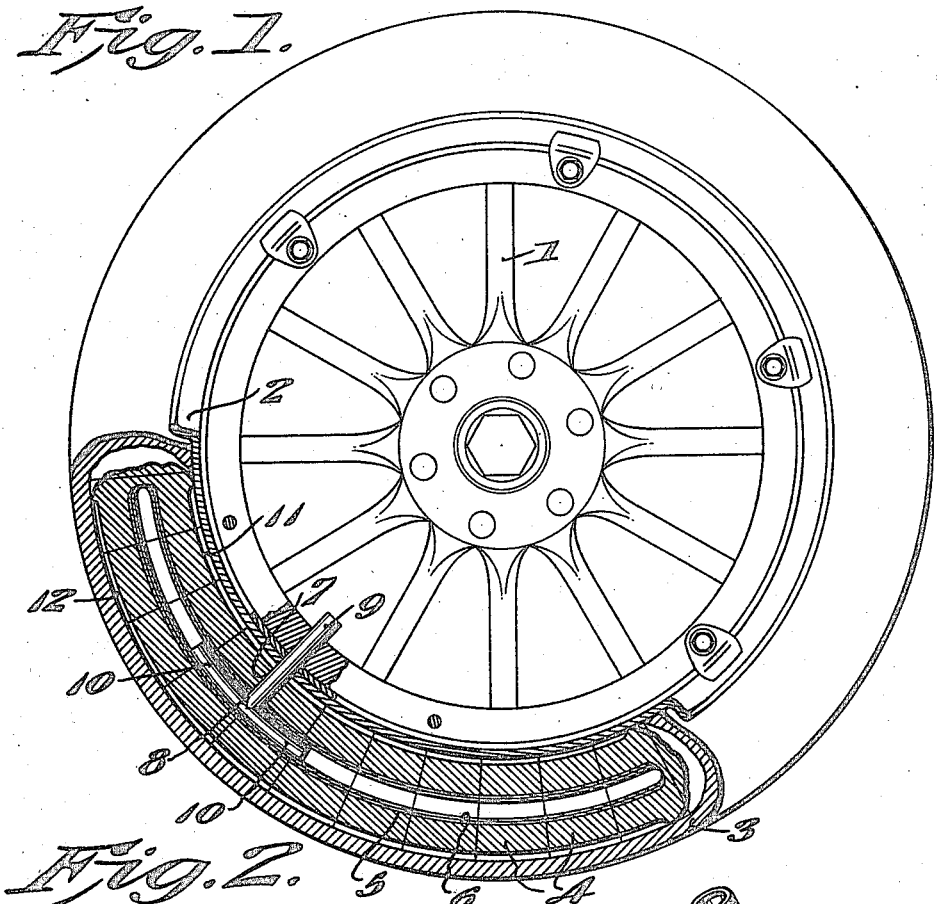
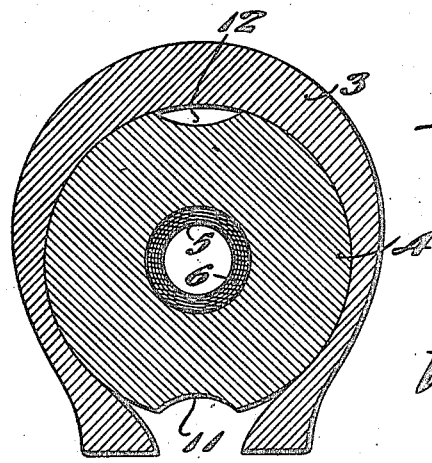
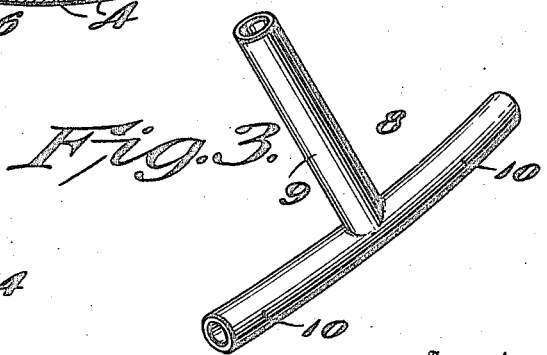
Inventor
Van L. Wilson
By R. M. McCracken
his Attorney Patented Nov. 6, 1923.

1,473,270

UNITED STATES PATENT OFFICE.

VAN L. WILSON, OF BOISE, IDAHO.

CUSHION TIRE.

Application filed March 23, 1920. Serial No. 368,071.

*To all whom it may concern:*

Be it known that I, VAN L. WILSON, citizen of the United States, residing at Boise, in the county of Ada and State of Idaho, have invented certain new and useful Improvements in Cushion Tires, of which the following is a specification.

My present invention pertains to cushion tires of the type in which a filler of rubber or other cushion material is placed for use in an outer casing, and particularly to a structure in which the filler is cooled while in use.

An object is to provide a tire with which cooling air is circulated through the filler and between the casing and filler to prevent overheating when the tire is in use.

Another object is to so construct the parts that a constant circulation of air at atmospheric temperature is induced and maintained by the shifting of the load supporting point in the use of the tire.

With these and other objects in view which will be apparent from the drawings, specification and claim, this invention includes certain novel features of construction and combinations of parts which will now be set forth.

In the drawings:

Figure 1 is a view in elevation of a wheel having a tire constructed in accordance with my invention fitted thereon, portions of the tire being in section to better show the construction.

Fig. 2 is a transverse sectional view through the casing and filler.

Fig. 3 is a view in perspective of the air intake and escape tube.

The wheel 1 is of any type now in use, and rim 2 is of a form to take the casing 3. This casing is of any type desired, either straight-sided or clincher, and in fact is a standard casing; it being a purpose of my invention to so construct and assemble the parts that the filler can be used in conjunction with the present forms and standard types of wheel, rim and casing structure.

The filler is made up of a plurality of independent sections 4, constructed and shaped to be fitted in the casing to provide a substantially continuous cushion filler, these sections each having a central opening or air circulation passage 5. The filler sections 4 are made of rubber or other cushion material which will give within the casing, and to preserve the shape of the air circulation passage 5 a lining 6, of fabric or other material, is provided for the opening forming said passage. This lining is cemented, vulcanized, or otherwise intimately joined with the material of the filler sections, and will give therewith to aid in absorbing shocks transmitted through the casing, although functioning to preserve the identity of the air passage and to protect the filler material there around.

The filler sections 4 are fitted in casing 3 so that openings 5 line up to form a continuous air passage centrally entirely through the filler, with lining 6 also substantially continuous. The adjacent ends of two filler sections are provided with radial grooves, as at 7, and a substantially T-shaped air intake and escape tube 8 is fitted with its stem 9 in these grooves and its head ends 10 received in the air passage openings of adjacent filler sections. The head of this tube is curved to conform to the curve of the passage and these ends may be of sufficient length to extend through two or more sections. In fitting the tire to the rim and wheel, the stem 9 is fitted through the openings provided for the valve stem of the usual pneumatic tire.

At its inner and outer sides each of the sections of the filler is grooved longitudinally as at 11 and 12, and when these filler sections are fitted in a casing these grooves extend peripherally around the tire filler adjacent the rim 2 and the crown of casing 3. These peripheral grooves provide additional air passages, and at the same time function somewhat after the manner of a vacuum cup to aid in retaining the fillers in place.

The manner of assembling and the results accomplished in use have been set forth somewhat in detail in the foregoing specification and it is believed lengthy recapitulation need not here be indulged in. However, attention might be called to the course of circulation of cooling air; atmospheric air being drawn in through the stem 9 of tube 8, forced through passage 5 by the shifting of the bearing point when the tire is traveling and the air then escaping through the stem 9 as it is compressed ahead of the bearing point.

While in the foregoing I have described specific embodiments, and have mentioned only certain possible modifications it will be appreciated that in practice I do not limit myself to such specific details as herein set forth, but may resort to any practical modifications falling within the scope of the invention as defined in the appended claim.

I claim:

In a cushion tire, a continuous hollow casing, a plurality of filler sections of cushion material placed within the casing in end abutting relation and unsecured, said sections being provided with central circumferential air circulating passages aligned when the sections are fitted in the casing and having inner and outer peripheral grooves diametrically in line with the center of the tread and the air circulating passage, and a substantially T-shaped air intake and escape tube fitted with its head branches in the air circulating passages of two adjacent sections of the filler and having its stem opening to the atmospheric air.

In testimony whereof I affix my signature.

VAN L. WILSON.